(12) United States Patent
Akita et al.

(10) Patent No.: US 11,611,250 B2
(45) Date of Patent: Mar. 21, 2023

(54) ROTATING ELECTRICAL MACHINE (71) Applicant: TOYOTA JIDOSHA KABUSHIKI KAISHA, Toyota (JP)

(72) Inventors: Mitsutoshi Akita, Nagoya (JP); Daisuke Ichigozaki, Toyota (JP); Tatsuhiko Hirano, Toyota (JP); Kyoko Nakamura, Nagoya (JP); Akira Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 17/192,303

(22) Filed: Mar. 4, 2021

(65) Prior Publication Data
US 2021/0281132 A1  Sep. 9, 2021

(30) Foreign Application Priority Data
Mar. 9, 2020 (JP) .............................. JP2020-039976

(51) Int. Cl.
*H02K 1/276* (2022.01)
*H02K 21/14* (2006.01)

(52) U.S. Cl.
CPC .......... *H02K 1/276* (2013.01); *H02K 1/2766* (2013.01); *H02K 1/2773* (2013.01); *H02K 21/14* (2013.01); *H02K 2213/03* (2013.01)

(58) Field of Classification Search
CPC .... H02K 1/276; H02K 1/2766; H02K 1/2773; H02K 2213/03; H02K 21/14
See application file for complete search history.

(56) References Cited

U.S. PATENT DOCUMENTS

| 2002/0050757 A1* | 5/2002 | Kako | H02K 1/17 |
| | | | 310/154.14 |
| 2011/0057533 A1* | 3/2011 | Murakami | H02K 1/2766 |
| | | | 310/156.43 |
| 2021/0384781 A1* | 12/2021 | Dajaku | H02K 21/16 |

FOREIGN PATENT DOCUMENTS

| JP | 2006-223052 A | 8/2006 |
| JP | 2014-103789 A | 6/2014 |

* cited by examiner

Primary Examiner — Alexander A Singh
(74) Attorney, Agent, or Firm — Sughrue Mion, PLLC (57) ABSTRACT

A plurality of auxiliary magnets is embedded in a rotor core so as to surround the rotation axis of the rotating electrical machine in the cross-section orthogonal to the rotation axis. A plurality of main magnets is embedded in the rotor core so as to extend from the auxiliary magnet in the outer circumferential direction of the rotor. A plurality of magnetic poles of the rotor is formed around the rotation axis, the magnetic poles each having the auxiliary magnet and the plurality of main magnets arranged at a distance from each other in the circumferential direction of the rotor, and the plurality of main magnets of each magnetic pole is arranged asymmetrically about a virtual line passing the rotation axis and axisymmetrically dividing the auxiliary magnet of each magnetic pole.

2 Claims, 13 Drawing Sheets

ROTATING ELECTRICAL MACHINE

CROSS REFERENCE TO RELATED APPLICATIONS

The present application claims priority from Japanese patent application JP 2020-039976 filed on Mar. 9, 2020, the entire content of which is hereby incorporated by reference into this application.

BACKGROUND

Technical Field

The present disclosure relates to a rotating electrical machine, and particularly to a rotating electrical machine including a rotor in which permanent magnets are embedded in a rotor core, and a stator positioned on the outer circumference of the rotor.

Background Art

As such type of rotating electrical machine, the one including a rotor having permanent magnets embedded in a rotor core made of a soft magnetic material, and a stator positioned on the outer circumference of the rotor has conventionally been proposed. The permanent magnets include a first magnet to be magnetized in the circumferential direction of the rotor, and a second magnet to be magnetized in the radial direction of the rotor. The magnetic poles of the rotor each have the second magnet and the first magnet contacting the second magnet (see, for example, JP 2014-103789 A).

SUMMARY

The rotating electrical machine disclosed in JP 2014-103789 A, however, uses a large amount of permanent magnets to be embedded in the rotor relative to the torque to be output by the rotating electrical machine, which likely causes a higher cost of the rotating electrical machine.

The present disclosure has been made in view of the foregoing, and provides a rotating electrical machine capable of obtaining a higher torque while limiting the amount of permanent magnets used.

In view of the foregoing, the rotating electrical machine according to the present disclosure includes a rotor with permanent magnets embedded in a rotor core made of a soft magnetic material, and a stator positioned on the outer circumference of the rotor, in which the permanent magnets include a main magnet arranged so as to be magnetized in the circumferential direction of the rotor, and an auxiliary magnet arranged so as to be magnetized in the radial direction of the rotor, the auxiliary magnet includes a plurality of auxiliary magnets, the plurality of auxiliary magnets being embedded in the rotor core so as to surround the rotation axis of the rotor in the cross-section orthogonal to the rotation axis, the main magnet includes a plurality of main magnets, the plurality of main magnets being embedded in the rotor core so as to extend from the auxiliary magnets in the outer circumferential direction of the rotor, a plurality of magnetic poles of the rotor is formed around the rotation axis, the magnetic poles each having the auxiliary magnet and the plurality of main magnets arranged at a distance from each other in the circumferential direction of the rotor, the soft magnetic material being disposed between the main magnets, and in the cross-section orthogonal to the rotation axis, the main magnets of each magnetic pole are arranged such that the plurality of main magnets are arranged asymmetrically about a virtual line passing the rotation axis and axisymmetrically dividing the auxiliary magnet of each magnetic pole.

According to the rotating electrical machine of the present disclosure, the main magnets of each magnetic pole are magnetized in the circumferential direction of the rotor, and the plurality of auxiliary magnets are magnetized in the radial direction of the rotor. Further, in each magnetic pole, the main magnets of each magnetic pole are arranged such that the permanent magnets of each magnetic pole are arranged asymmetrically about the virtual line. Therefore, as is also evident from the analysis results that will be described later, when the rotating electrical machine is driven, the vector of the magnetic flux of the main magnets directed toward the stator (teeth thereof) is assisted by the magnetic flux from the auxiliary magnet to be formed so as to be inclined relative to the radial direction of the outer circumferential surface of the rotor. Since the main magnets are arranged so as to be magnetized in the circumferential direction of the rotor, the vector of the magnetic flux of the main magnets is likely to be formed so as to be inclined relative to the radial direction of the rotor. Resultantly, with such an inclined vector of the magnetic flux, a vector as a driving force of the rotor is generated along the tangential direction of the rotor from the outer circumferential surface of the rotor, so that the torque of the rotating electrical machine can be secured even with a fewer amount of magnets.

The state of being "arranged so as to be magnetized in the circumferential direction of the rotor" in the present disclosure means that the direction of magnetization of the magnet (main magnet) does not correspond to the radial direction, but is formed on the magnet so as to cross the radial direction of the rotor.

In some embodiments, in the cross-section, with the rotation axis as a center, the plurality of main magnets of each magnetic pole is arranged within an arrangement region having a central angle obtained by multiplying, by a coefficient of 0.10 to 0.55, the central angle of an entire fan-shaped region where the auxiliary magnet of each magnetic pole is disposed.

According to such an embodiment, as is also evident from the results of analysis conducted by the inventors, with the plurality of main magnets of each magnetic pole arranged within the arrangement region, the magnetic flux of the main magnets is formed in the soft magnetic materials between the plurality of main magnets and outside the arrangement region, so that the vector of the magnetic flux of the main magnets is likely to be formed so as to be inclined relative to the radial direction of the rotor. Consequently, with such an inclined vector of the magnetic flux, the torque of the rotating electrical machine can be increased. Herein, as is also evident from the results of analysis conducted by the inventors, which will be described later, when the coefficient is less than 0.10, it may be unable to obtain sufficient effect of improving the torque of the rotating electrical machine relative to the amount of magnets by splitting the main magnet. Meanwhile, when the coefficient exceeds 0.55, the effect of improving the torque of the rotating electrical machine may not sufficiently be obtained by arranging the plurality of main magnets asymmetrically.

In some embodiments, in each magnetic pole, one of the plurality of main magnets is disposed at an end of the auxiliary magnet. According to such an embodiment, since one of the plurality of main magnets is disposed at an end of the auxiliary magnet, the main magnet is consequently disposed at an end on one side of each magnetic pole. As a result, the magnetic flux of the auxiliary magnet can effectively be formed so as to improve the torque of the rotating electrical machine.

According to the present disclosure, a higher torque can be obtained while limiting the amount of permanent magnets used.

DETAILED DESCRIPTION

Figure 1:
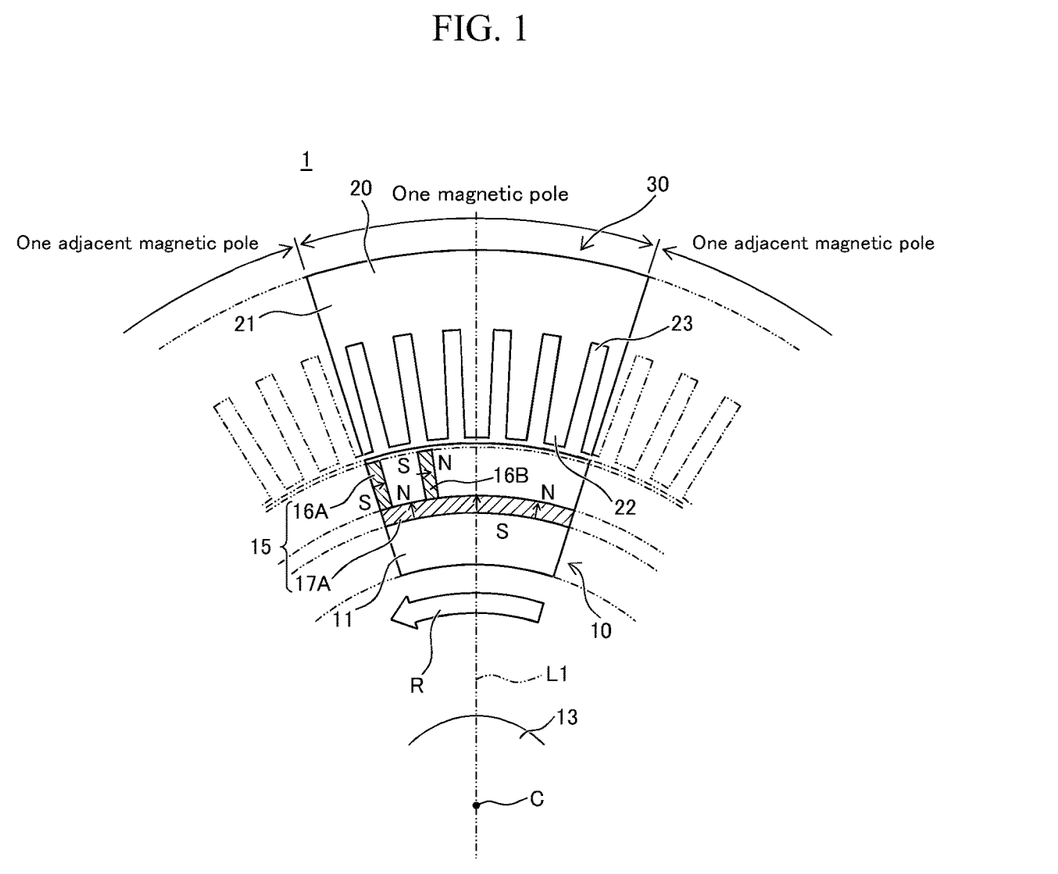
FIG. 1 is a schematic cross-sectional view of a main part of a rotor and a stator showing an embodiment of a rotating electrical machine according to the present disclosure, as is cut in a direction orthogonal to the rotation axis of the rotating electrical machine.
Figure 2:
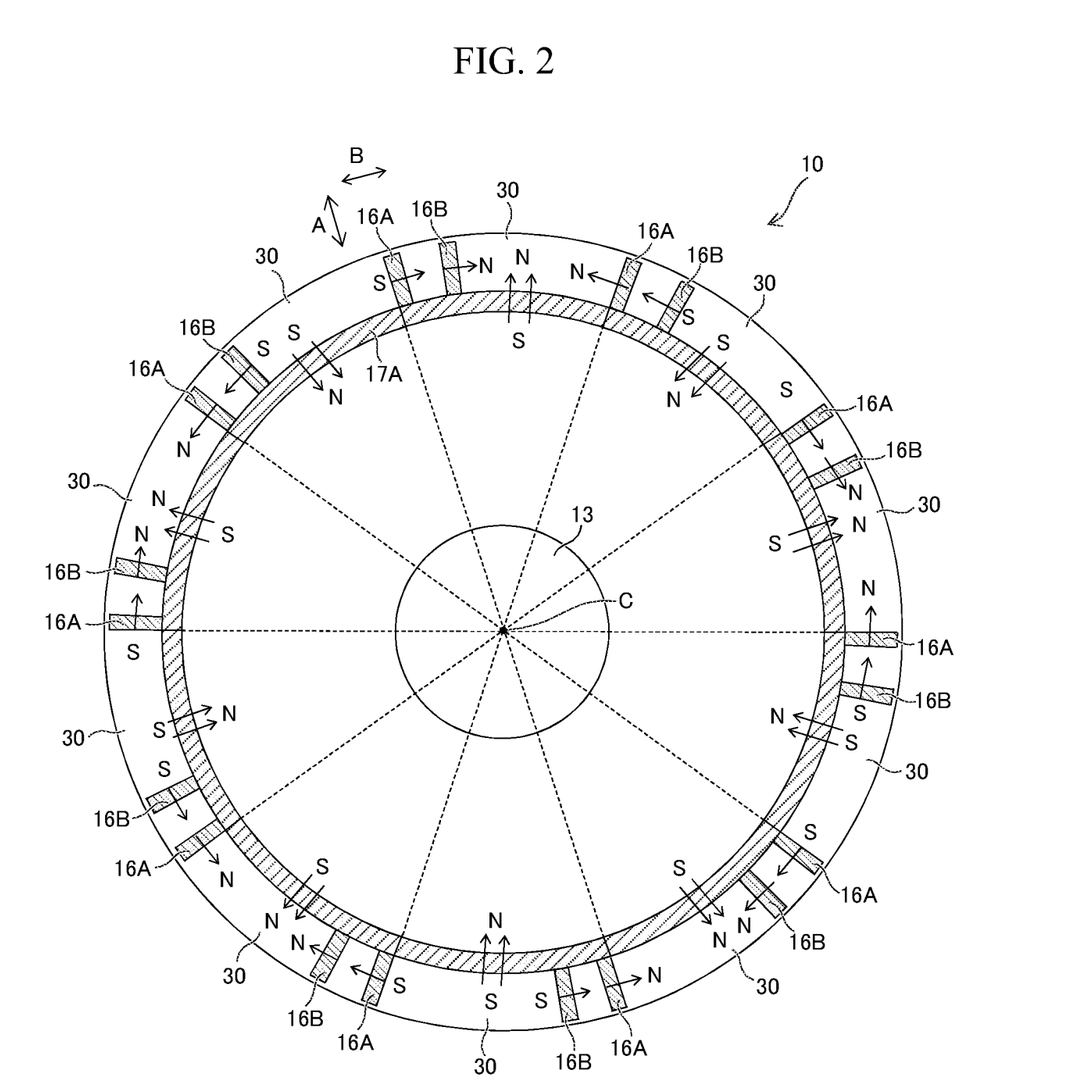
FIG. 2 is a schematic cross-sectional view showing the overall structure of the rotor illustrated in FIG. 1.
Figure 3:
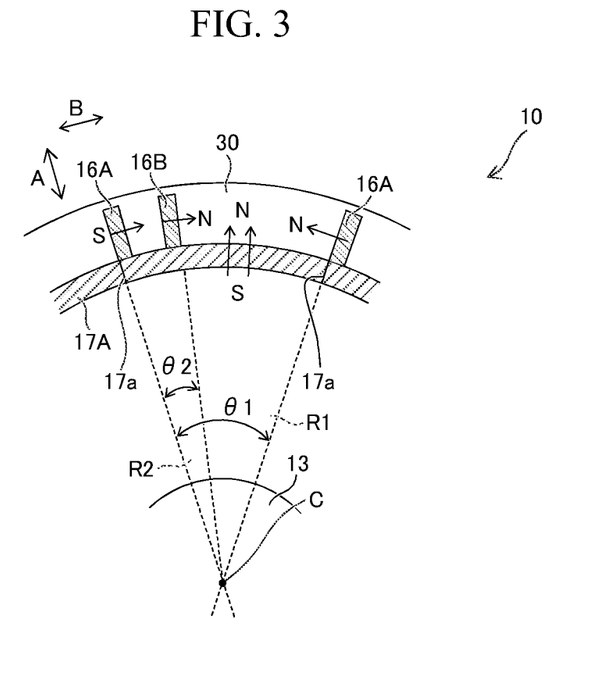
FIG. 3 is a schematic cross-sectional view for explaining an arrangement range for a plurality of main magnets illustrated in FIG. 1.
Figure 4:
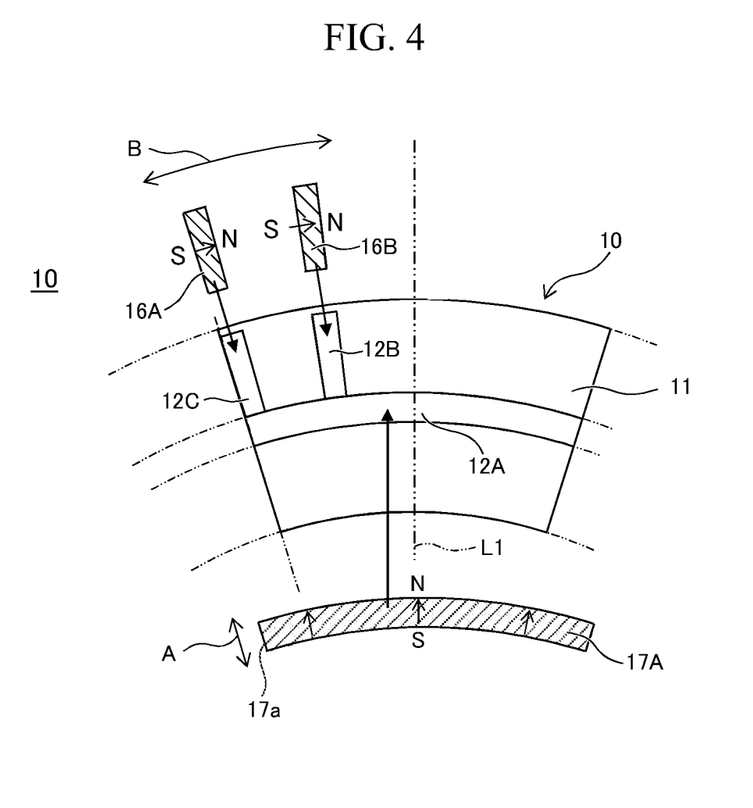
FIG. 4 is an enlarged view illustrating in detail the main magnets and auxiliary magnet in one magnetic pole of the rotating electrical machine illustrated in FIG. 1.
Figure 5:
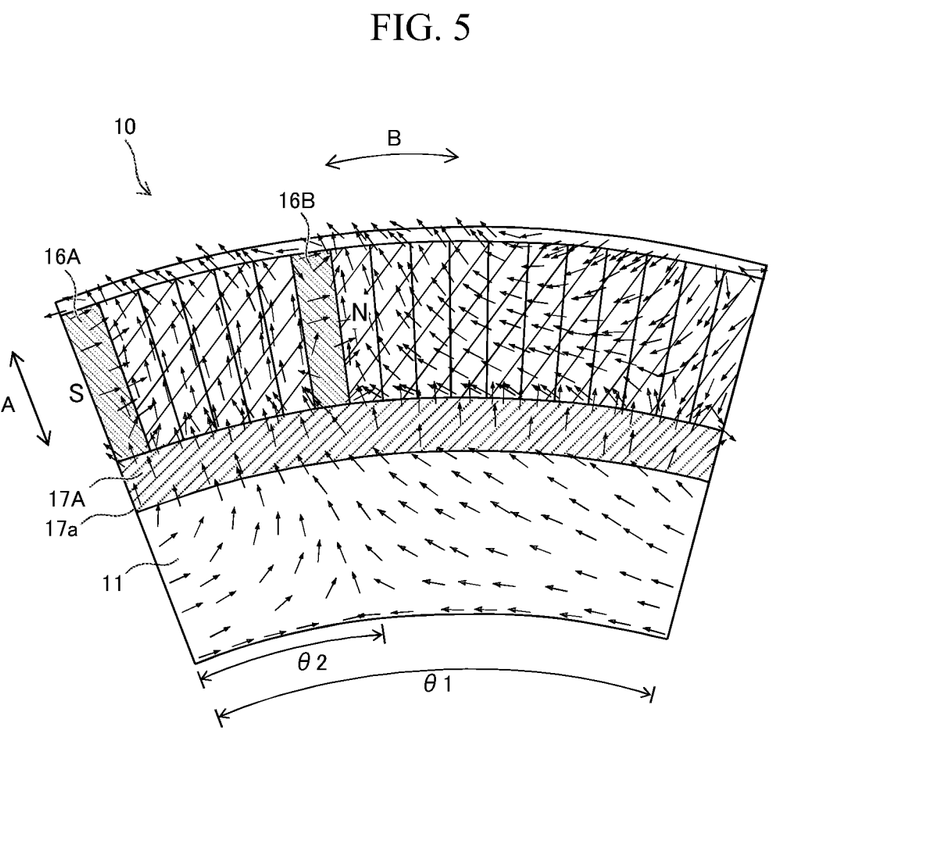
FIG. 5 is a schematic view showing a vector of a magnetic flux generated when a coil is energized between the stator and the rotor illustrated in FIG. 1.

An embodiment of a rotating electrical machine according to the present disclosure will be detailed below on the basis of the drawings. FIG. 1 is a schematic cross-sectional view of a main part of a rotor and a stator showing an embodiment of a rotating electrical machine according to the present disclosure, as is cut in a direction orthogonal to the rotation axis of the rotating electrical machine. FIG. 2 is a schematic cross-sectional view showing the overall structure of the rotor illustrated in FIG. 1. FIG. 3 is a schematic cross-sectional view for explaining an arrangement range for a plurality of main magnets illustrated in FIG. 1. FIG. 4 is an enlarged view illustrating in detail the main magnets and auxiliary magnet in one magnetic pole of the rotating electrical machine illustrated in FIG. 1. FIG. 5 is a schematic view showing a vector of a magnetic flux generated when a coil is energized between the stator and the rotor illustrated in FIG. 1.

In FIGS. 1 and 2, a rotating electrical machine 1 includes a cylindrical rotor 10 and a stator 20, the rotor 10 being disposed on the inner circumferential side of the stator 20 and facing the stator 20 with a clearance in the radial direction, and being adapted to rotate relative to the stator 20. The rotating electrical machine 1 is an IPM (Interior Permanent Magnet) motor including the rotor 10 with permanent magnets 15 embedded in a rotor core 11, and the stator 20 positioned on the outer circumference of the rotor 10.

The rotor 10 is adapted to rotate about a rotation axis C, and a rotary shaft 13 having the rotation axis C as the shaft center is fitted into the rotor core 11. The rotor 10 has a plurality of magnetic poles 30 formed around the rotation axis C, with the permanent magnets 15 arranged, which will be described later. An even number of magnetic poles 30 are provided, and in the present embodiment, the rotor 10 has ten fan-shaped magnetic poles 30. In this case, the fan-shaped magnetic poles 30 each have a central angle of 36°. Further, the permanent magnets 15 of the adjacent magnetic poles 30 on the opposite sides of each magnetic pole are magnetized in the opposite directions, and in the present embodiment, the permanent magnets 15 of the adjacent magnetic poles 30 are arranged in the same positions.

The rotor core 11 is made of a soft magnetic material, examples of which include those with electromagnetic steel sheets laminated and those obtained by press-forming and then sintering soft magnetic powder. It should be noted that the electromagnetic steel sheets may be joined together with an insulating resin. Examples of the soft magnetic material forming the rotor core 11 include, but not limited to, those having at least one type of magnetic metal selected from a group consisting of Fe, Co, and Ni and at least one type of non-magnetic metal selected from a group consisting of B, C, P, Al, Si, Ti, V, Cr, Mn, Cu, Y, Zr, Nb, Mo, Hf, Ta, and W.

Examples as a representative material of the soft magnetic material include, but not limited to, a FeCo alloy (such as FeCo and FeCoV), FeNi alloy (such as FeNi, FeNiMo, FeNiCr, and FeNiSi), FeAl alloy or FeSi alloy (such as FeAl, FeAlSi, FeAlSiCr, FeAlSiTiRu, and FeAlO), FeTa alloy (such as FeTa, FeTaC, and FeTaN), and FeZr alloy (such as FeZrN).

Examples of the permanent magnet 15 include rare-earth magnets, such as a neodymium magnet containing neodymium, iron, and boron as the main components, and a samarium cobalt magnet containing samarium and cobalt as the main components. The permanent magnet 15 may be other magnets, such as a ferrite magnet and alnico magnet.

The permanent magnets 15 arranged in one magnetic pole 30 include two main magnets 16A and 16B and one auxiliary magnet 17A. As illustrated in FIG. 4, in the present embodiment, the rotor core 11 has formed therein a magnet insertion hole 12A, into which the auxiliary magnet 17A is inserted, so as to surround the rotation axis C.

Further, the rotor core 11 has formed therein a plurality of magnet insertion holes 12B and 12C, into which the main magnets 16A and 16B are inserted. The plurality of magnet insertion holes 12B and 12C is formed continuously on the outer circumferential side of the magnet insertion hole 12A and radially from the magnet insertion hole 12A. In the present embodiment, the magnet insertion holes 12A to 12C are formed along the rotation axis C, each hole having an opening on one side and a bottom (not shown) on the other side.

It should be noted that in the present embodiment, the adjacent magnet insertion holes 12A to 12C are formed as one continuous hole, but for example, a bridge (partition) may be formed in a portion of the rotor core 11 to separate the magnet insertion holes 12A and 12A that are adjacent in the circumferential direction. Also, a bridge (partition) may be formed in a portion of the rotor core 11 to separate the magnet insertion hole 12A from the magnet insertion holes 12B and 12C. These bridges (partitions) are made of the soft magnetic material forming the rotor core 11 and integrally formed with the rotor core 11.

The magnet insertion holes 12B and 12C, into which the main magnets 16A and 16B are inserted, are formed in the cross-section orthogonal to the rotation axis C of the rotating electrical machine 1, so as to be asymmetrical about a virtual line L1 passing the rotation axis C and axisymmetrically dividing the magnet insertion hole 12A. That is, given that a rotating direction R of the rotor 10 is in the counterclockwise direction, the magnet insertion holes 12B and 12C, into which the main magnets 16A and 16B are inserted, are formed on one side disproportionately relative to the virtual line L1.

In the present embodiment, the auxiliary magnet 17A is inserted into the magnet insertion hole 12A, while the main magnets 16A and 16B are inserted into the magnet insertion holes 12B and 12C. In each magnetic pole 30, the main magnets 16A and 16B are arranged such that the permanent magnets 15 are arranged asymmetrically about the virtual line L1 axisymmetrically dividing one auxiliary magnet 17A of the rotor 10. In the present embodiment, the virtual line L1 corresponds to a line bisecting the central angle of the fan-shaped magnetic pole 30. The "arrangement of the permanent magnets" in the present specification refers to the arrangement of the permanent magnets including both the main magnet and auxiliary magnet that form one magnetic pole.

As illustrated in FIG. 1, in one magnetic pole 30, the main magnets 16A and 16B are arranged such that the permanent magnets 15 including the plurality of (two) main magnets 16A and 16B and the auxiliary magnet 17A are asymmetrically arranged. In the present embodiment, in each magnetic pole 30, the main magnets 16A and 16B are arranged on one side of the auxiliary magnet 17A.

In the present embodiment, in each magnetic pole 30, the two main magnets 16A and 16B are arranged on one side (left side in FIG. 1) disproportionately relative to the virtual line L1. In the present embodiment, in each magnetic pole 30, one main magnet 16A of the plurality of main magnets 16A and 16B is disposed at an end 17a of the auxiliary magnet 17A.

The two main magnets 16A and 16B are arranged so as to be magnetized in a circumferential direction B of the rotor 10. Specifically, as illustrated in FIG. 1 and FIG. 4, the main magnets 16A and 16B are magnetized in the circumferential direction B, and the direction of magnetization of the two main magnets 16A and 16B is in the clockwise direction about the rotation axis C. It should be noted that in the present specification, the "direction of magnetization" means the direction of the magnetic flux that flows out of the north pole, and corresponds to the direction connecting the south pole and the north pole of one magnet.

As illustrated in FIG. 3, in the cross-section orthogonal to the rotation axis C of the rotor 10, with the rotation axis C as a center, the plurality of main magnets 16A and 16B of each magnetic pole 30 is arranged within an arrangement region R2 having a central angle θ2 obtained by multiplying, by a coefficient of 0.10 to 0.55, a central angle θ1 of an entire fan-shaped region R1 where the auxiliary magnet 17A of each magnetic pole is disposed.

Herein, the entire region R1 is a fan-shaped region segmenting the magnetic poles 30 in the cross-section of the rotor 10. In the present embodiment, the entire region R1 is a region surrounded by two straight lines connecting the rotation axis C and the opposite ends of the auxiliary magnet 17A and the outer circumference of the rotor 10. The arrangement region R2 is a fan-shaped region where the plurality of main magnets 16A and 16B of each magnetic pole 30 is arranged, having the minimum central angle with which the plurality of main magnets 16A and 16B can be included.

In the magnetic poles 30 adjacent on the opposite sides of the magnetic pole 30 illustrated in FIG. 1, the main magnets 16A and 16B are arranged so as to be magnetized in the circumferential direction B of the rotor 10 (see FIG. 2). However, the direction of magnetization of the main magnets 16A and 16B of the adjacent magnetic poles 30 is in the counterclockwise direction about the rotation axis C, which is different from that in FIG. 1.

Specifically, the north pole and south pole of the main magnets 16A and 16B of the adjacent magnetic poles 30 are inverted from those of the main magnets 16A and 16B of the magnetic pole 30 illustrated in FIG. 1. In this manner, in the present embodiment, the main magnets 16A and 16B of the magnetic poles 30 are arranged such that the main magnets 16A and 16B of the adjacent magnetic poles 30 are magnetized alternately in the opposite directions.

Further, the magnetic pole 30 illustrated in FIG. 1 is provided with one auxiliary magnet 17A. The auxiliary magnet 17A is in an arc shape and arranged so as to be magnetized outward in a radial direction A. Specifically, the auxiliary magnet 17A illustrated in FIG. 1 is arranged such that the south pole is on the inner circumferential side and the north pole is on the outer circumferential side.

Since the rotor 10 has ten magnetic poles, as illustrated in FIG. 2, the rotor core 11 is provided with ten auxiliary magnets 17A. These auxiliary magnets 17A are arranged so as to surround the rotation axis C. The magnetic poles 30 each have the auxiliary magnet 17A and the main magnets 16A and 16B contacting the auxiliary magnet 17A.

In the magnetic poles 30 adjacent on the opposite sides of the magnetic pole 30 illustrated in FIG. 1, the auxiliary magnets 17A are arranged so as to be magnetized in the radial direction A of the rotor 10 (see FIG. 2). However, the auxiliary magnets 17A of the adjacent magnetic poles 30 are magnetized such that the north pole is on the inner circumferential side and the south pole is on the outer circumferential side, and the auxiliary magnets 17A of the adjacent magnetic poles 30 are magnetized inward in the radial direction A, which are different from those in FIG. 1.

Specifically, the north pole and south pole of the auxiliary magnets 17A of the adjacent magnetic poles 30 are inverted from those of the auxiliary magnet 17A of the magnetic pole 30 illustrated in FIG. 1. In this manner, in the present embodiment, the auxiliary magnets 17A of the magnetic poles 30 are arranged such that the auxiliary magnets 17A of the adjacent magnetic poles 30 are magnetized alternately in the opposite directions.

Then, the stator 20 has a tubular stator core 21, from which a plurality of teeth 22 extends toward the rotation axis C in the inner circumferential direction. Therefore, spaces between the plurality of teeth 22 form slots 23, into which coils (not shown) for magnetizing the stator 20 are to be inserted.

The stator 20 is made of a soft magnetic material as with the rotor 10. The stator 20 is configured such that the six teeth 22 face one magnetic pole of the rotor 10. The teeth 22 are wound with a coil (not shown), and magnetized when the coil is energized. In the present embodiment, the way of winding the coil is not particularly limited, but the present embodiment adopts the distributed winding to wind the coil.

The effects of the rotating electrical machine 1 of the present embodiment configured as described above will be described below. When the coil wound around the teeth 22 of the stator 20 is energized, the teeth 22 of the stator 20 are magnetized, and with the magnetic attraction between the main magnets 16A and 16B and the auxiliary magnet 17A of the rotor 10, the torque to rotate the rotor 10 in a counter-clockwise direction R is generated.

Specifically, in the rotating electrical machine 1 according to the present embodiment, in the cross-section orthogonal to the rotation axis C of the rotor 10, the virtual line L1 axisymmetrically dividing the auxiliary magnet 17A passes the rotation axis C and axisymmetrically divides the auxiliary magnet 17A in one magnetic pole of the rotor 10. The main magnets 16A and 16B of each magnetic pole 30 are arranged such that the permanent magnets 15 are asymmetrically arranged relative to the virtual line L1. Further, the main magnets 16A and 16B are arranged so as to be magnetized in the circumferential direction of the rotor 10. In addition, in the rotating electrical machine 1, the arc-shaped auxiliary magnets 17A are arranged so as to be magnetized in the radial direction A of the rotor 10.

Therefore, upon energizing the coil to drive the rotating electrical machine 1, as illustrated in FIG. 5, the vector of the magnetic flux in the circumferential direction flowing out of the main magnets 16A and 16B is assisted by the magnetic flux from the auxiliary magnet 17A to be formed so as to be inclined relative to the radial direction of the rotor 10. Since the permanent magnets 15 are asymmetrically arranged, the magnetic flux from the main magnets 16A and 16B disproportionately flows near the main magnets 16A and 16B, so that the magnetic flux (magnetic flux inclined relative to the radial direction of the rotor 10) that contributes to the rotation of the rotor 10 is likely to be formed.

Due to such a magnetic flux formed, a vector as a driving force of the rotor 10 is generated on the surface of the rotor 10. This vector increases the torque to drive the rotor 10, so that the rotating electrical machine 1 can obtain a large driving torque even with a fewer amount of permanent magnets 15 used.

In particular, in the present embodiment, as illustrated in FIG. 3, the plurality of main magnets 16A and 16B of each magnetic pole 30 is arranged within the arrangement region R2. With such arrangement, the magnetic flux of the main magnets 16A and 16B is formed in the soft magnetic material between the plurality of main magnets 16A and 16B and outside the arrangement region R2, and the vector of the magnetic flux of the main magnets 16A and 16B is likely to be formed so as to be inclined relative to the radial direction A of the rotor 10. Resultantly, with such an inclined vector of the magnetic flux, the torque of the rotating electrical machine 1 can be increased.

Herein, as is also evident from the analysis results that will be described later, when the aforementioned coefficient that determines the range of the arrangement region R2 is less than 0.10, it may be unable to obtain sufficient effect of improving the torque of the rotating electrical machine relative to the amount of magnets by splitting the main magnets 16A and 16B. Meanwhile, when the coefficient that determines the arrangement region R2 exceeds 0.55, the effect of improving the torque of the rotating electrical machine 1 may not sufficiently be obtained by arranging the plurality of main magnets 16A and 16B asymmetrically.

Further, since one of the plurality of main magnets 16A and 16B is disposed at an end of the auxiliary magnet 17A, the main magnet is consequently disposed at an end on one side of each magnetic pole 30. As a result, the magnetic flux of the auxiliary magnet 17A can effectively be formed so as to improve the torque of the rotating electrical machine 1.

Figure 6A:
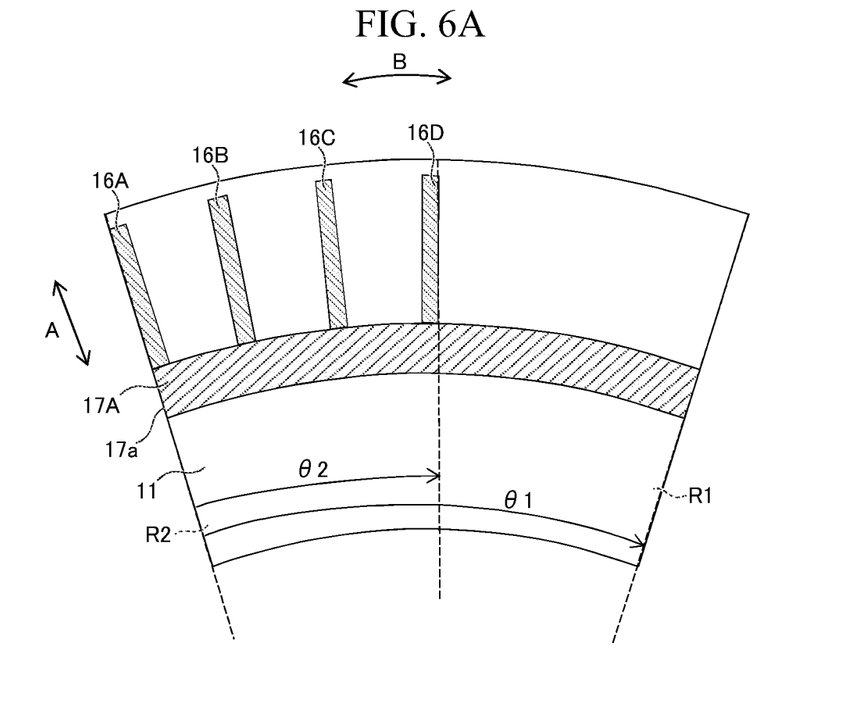
FIG. 6A is an enlarged view of the main part of the rotor according to a modification of the present embodiment.

In the present embodiment, in the cross-section orthogonal to the rotation axis C of the rotating electrical machine 1, the two main magnets 16A and 16B are arranged such that the permanent magnets 15 are arranged asymmetrically about the virtual line L1 passing the rotation axis C and axisymmetrically dividing the auxiliary magnet 17A. However, as illustrated in FIG. 6A, for example, four main magnets 16A to 16D may be arranged in the arrangement region R2.

Figure 7:
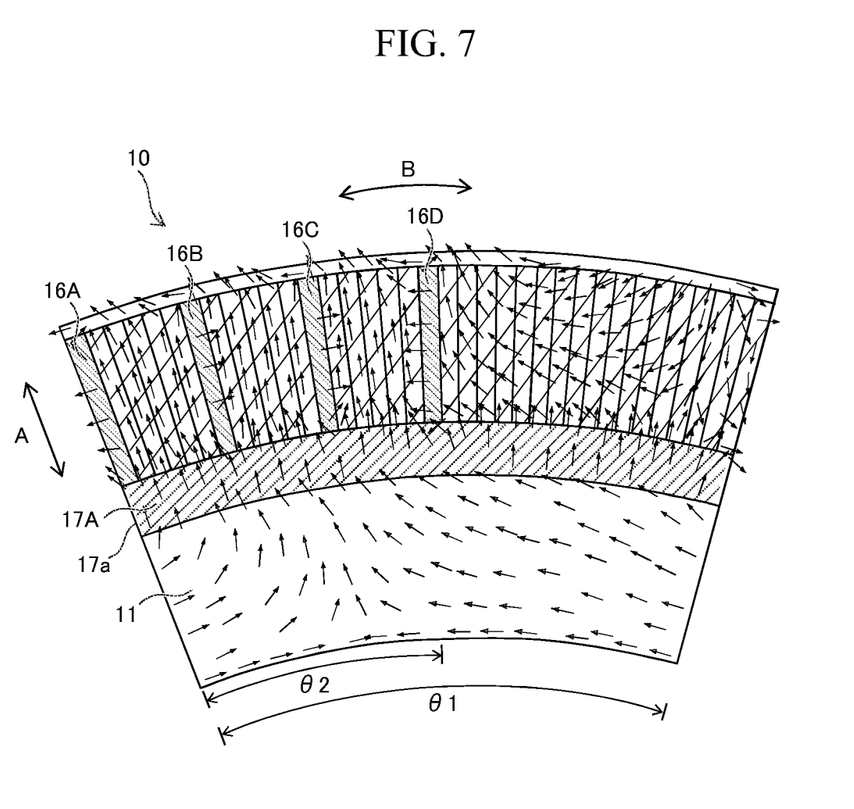
FIG. 7 is a schematic view showing a vector of a magnetic flux generated when a coil is energized between the stator and the rotor illustrated in FIG. 6A.

Also in this case, upon energizing the coil to drive the rotating electrical machine 1, as illustrated in FIG. 7, the vector of the magnetic flux in the circumferential direction flowing out of the main magnets 16A to 16D is assisted by the magnetic flux from the auxiliary magnet 17A to be formed so as to be inclined relative to the radial direction of the rotor 10. Since the permanent magnets 15 are asymmetrically arranged, the magnetic flux from the main magnets 16A to 16D disproportionately flows near the main magnets 16A to 16D, so that the magnetic flux (magnetic flux inclined relative to the radial direction of the rotor 10) that contributes to the rotation of the rotor 10 is likely to be formed. In particular, when the amount of magnets of the main magnets 16A and 16B illustrated in FIG. 3 is almost equivalent to that of the main magnets 16A to 16D illustrated in FIG. 6A, the rotor 10 illustrated in FIG. 6A, in which the magnets are split into smaller pieces, is expected to improve the torque relative to the amount of the magnets used.

Figure 6B:
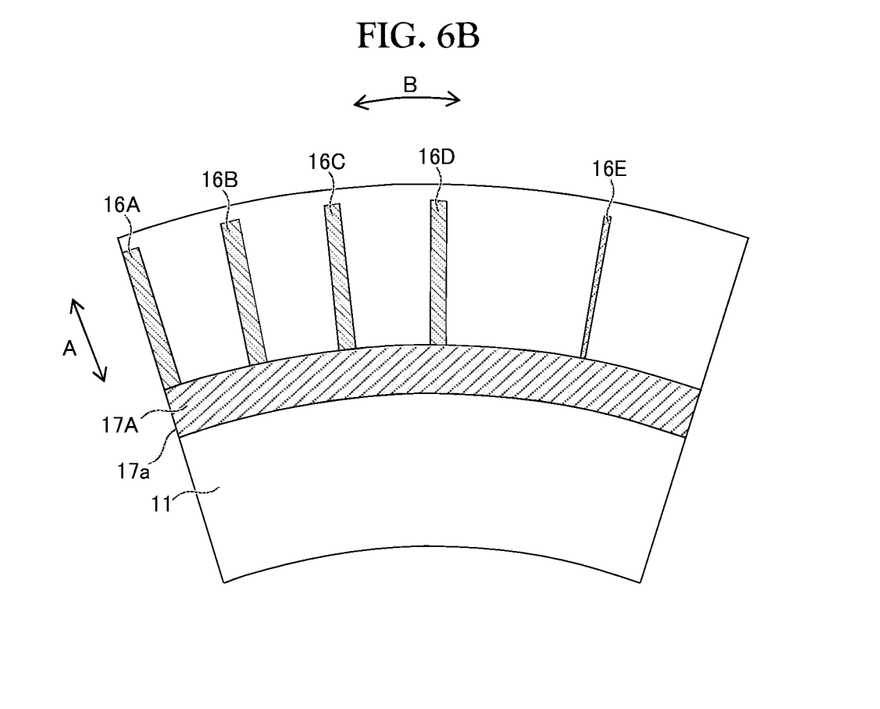
FIG. 6B is an enlarged view of the main part of the rotor according to another modification of the present embodiment.

It should be noted that as in a modification illustrated in FIG. 6B, as long as the main magnets 16A to 16E of each magnetic pole 30 are arranged such that the plurality of main magnets 16A and 16E are arranged asymmetrically about the virtual line L1, the main magnet 16E may be disposed in a position outside the range of the arrangement region R2.

Further, in the embodiment illustrated in FIG. 2, the main magnets 16A and 16B are not exposed from the circumferential surface of the rotor 10, but the end faces of the main magnets 16A and 16B may be exposed from the rotor 10. In this case, the exposed surfaces of the main magnets 16A and 16B partially form the circumferential surface of the rotor 10. With the main magnets 16A and 16B exposed from the circumferential surface of the rotor 10, the soft magnetic material forming the rotor core 11 is not present between the main magnets 16A and 16B and the stator 20. Accordingly, since the magnetic flux of the main magnets can flow with a greater inclination relative to a radial direction D of the rotor 10, the torque of the rotating electrical machine 1 can be further increased.

Figure 8:
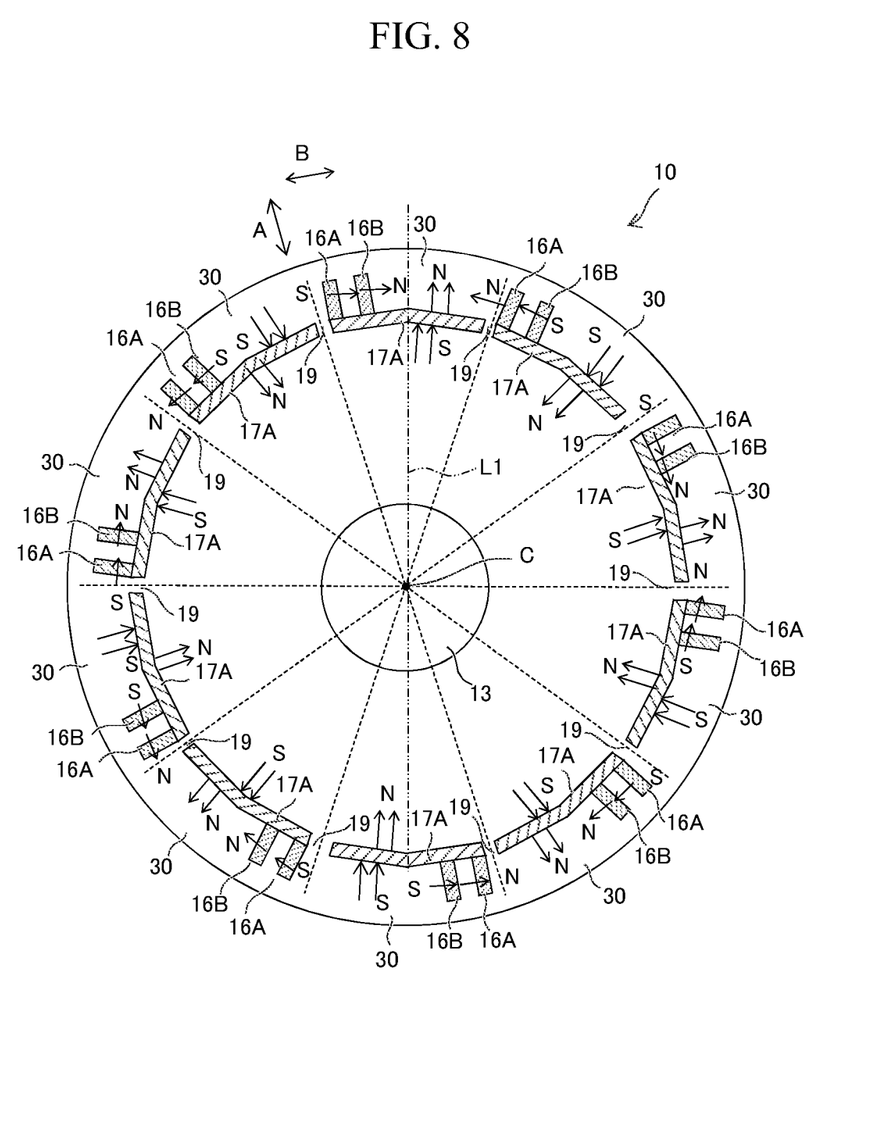
FIG. 8 is a schematic outlined view showing the overall structure of the rotor according to another modification of the present embodiment.

Other than the above, the auxiliary magnets 17A illustrated in FIG. 1 to FIG. 7 are permanent magnets in an arc shape, but may be, for example, those in a flat shape as illustrated in FIG. 8. In FIG. 8, two flat permanent magnets are arranged along the tangential direction in each magnetic pole 30, and the auxiliary magnet 17A is arranged in a bent form. Since the permanent magnets in a flat shape are easy to produce, the production cost of the rotor 10 can be reduced. In this case, a portion where the virtual line L1 passes in the auxiliary magnet 17A of each magnetic pole 30 is magnetized in the radial direction A of the rotor 10. In addition, a bridge 19, which is a portion of the rotor core 11, is formed between the auxiliary magnets 17A, so that the strength of the rotor core 11 can be enhanced.

EXAMPLES

The present disclosure will be described below on the basis of the examples.

Example 1

Figure 9:
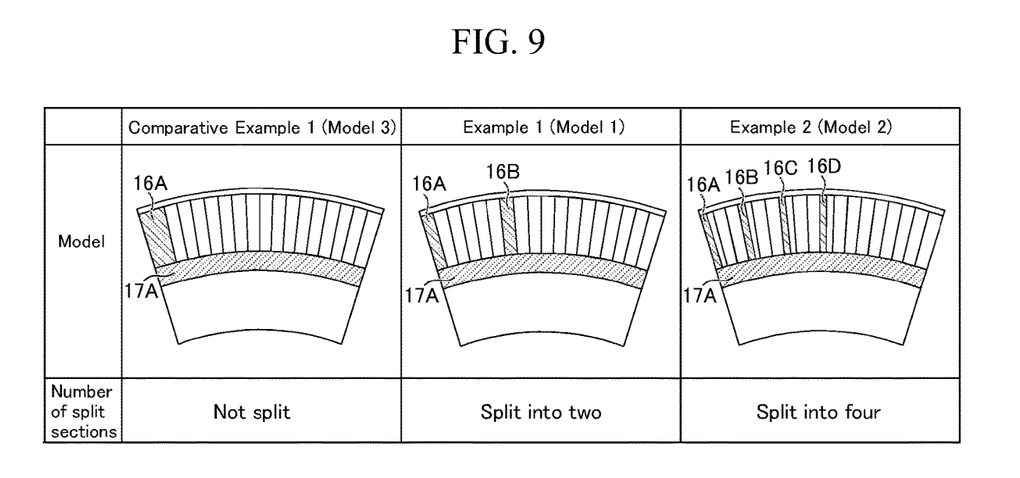
FIG. 9 is a table of views of models in one magnetic pole of the rotor in Examples 1 and 2 and Comparative Example 1.

A model 1 of a rotor corresponding to the rotor 10 of FIG. 1, which includes two main magnets 16A and 16B in one magnetic pole, was prepared. It should be noted that FIG. 9 illustrates the rotor 10 of FIG. 1 as schematically shown as the model 1. The model 1 is a model in which the main magnet according to Comparative Example 1, which will be described later, is split into two. Physical property values were applied to the model 1 to analyze the surface force (component in the rotating direction) in one magnetic pole of the rotor. Based on the obtained surface force, the torque of the rotating electrical machine was calculated, and a value was obtained by dividing the torque by the amount of magnets used in weight (magnet amount).

Example 2

A model 2 was prepared in the same manner as in Example 1. Example 2 differs from Example 1 in that in Example 2, one magnetic pole was provided with four main magnets 16A to 16D. It should be noted that the amount of the main magnets used in Example 2 was the same as that in Example 1, and the model 2 is a model in which the main magnet according to Comparative Example 1, which will be described later, is split into four. Physical property values were applied to the model 2 to analyze the surface force (component in the rotating direction) in one magnetic pole of the rotor. Based on the obtained surface force, the torque of the rotating electrical machine was calculated, and a value was obtained by dividing the torque by the amount of magnets used in weight (magnet amount).

Comparative Example 1

A model 3 was prepared in the same manner as in Example 1. Comparative Example 1 differs from Example 1 in that in Comparative Example 1, one magnetic pole was provided with one main magnet 16A. It should be noted that the amount of the main magnets used in Comparative Example 1 was the same as that in Example 1. Physical property values were applied to the model 3 to analyze the surface force (component in the rotating direction) in one magnetic pole of the rotor. Based on the obtained surface force, the torque of the rotating electrical machine was calculated, and a value was obtained by dividing the torque by the amount of magnets used in weight (magnet amount).

Figure 10:
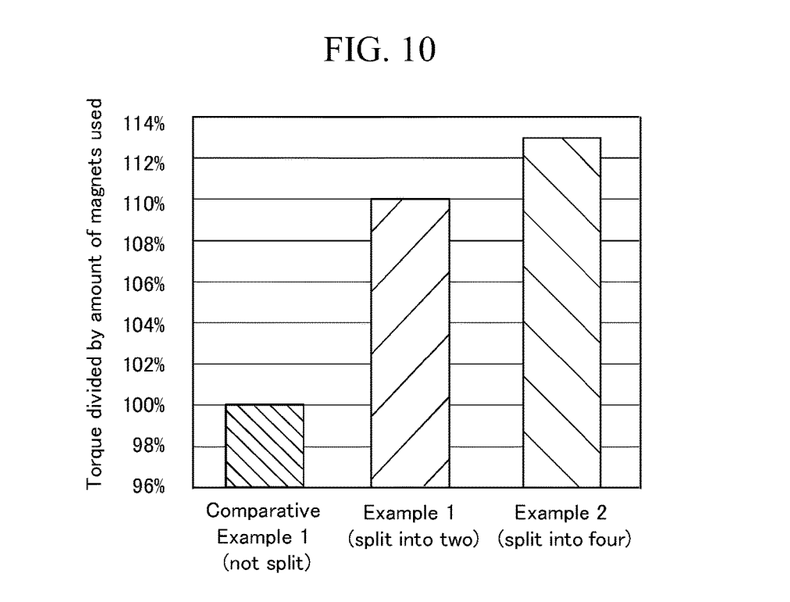
FIG. 10 is a graph showing the results obtained by dividing the torque by the amount of magnets used in Examples 1 and 2 and Comparative Example 1 illustrated in FIG. 9.
Figure 11:
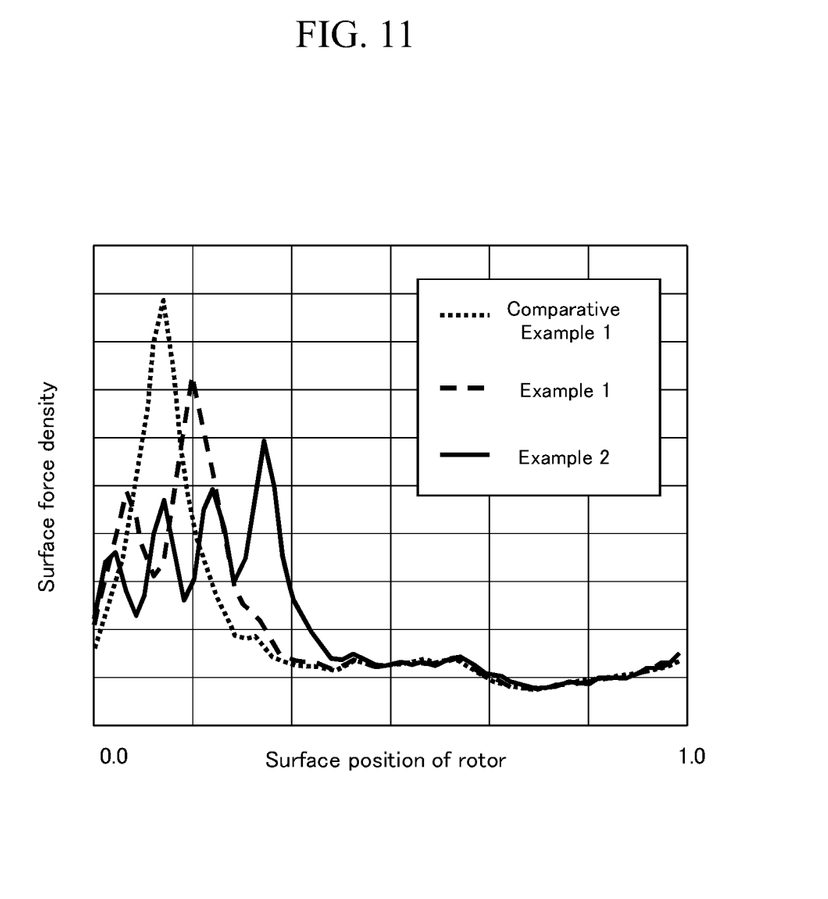
FIG. 11 is a graph showing the relations between the surface position and surface force density of the rotor in Examples 1 and 2 and Comparative Example 1 illustrated in FIG. 10.

The results obtained by dividing the torque by the amount of magnets used and the surface force of the rotor according to Examples 1 and 2 and Comparative Example 1 are shown in FIG. 10 and FIG. 11. FIG. 10 is a graph showing the results obtained by dividing the torque by the amount of magnets used in Examples 1 and 2 and Comparative Example 1, which are illustrated in FIG. 9, and FIG. 11 is a graph showing the relations between the surface position and the surface force density of the rotor in Examples 1 and 2 and Comparative Example 1, which are illustrated in FIG. 10. It should be noted that in FIG. 10, the value obtained by dividing the torque by the amount of magnets used in Comparative Example 1 is defined as 1.0, and in FIG. 11, the surface force density of a predetermined value is defined as 1.0.

As illustrated in FIG. 10, the result obtained by dividing the torque by the amount of magnets used in the rotor in Example 1 was improved by 10% as compared to that of Comparative Example 1. The result obtained by dividing the torque by the amount of magnets used in the rotor in Example 2 was improved by 13% as compared to that of Comparative Example 1. Further, as illustrated in FIG. 11, the waveform of the surface force density of the rotor formed a peak in accordance with the number of main magnets, and it is considered that the surface force density was able to be effectively generated in the order of Example 2, Example 1, and Comparative Example 1.

Example 3

Figure 12:
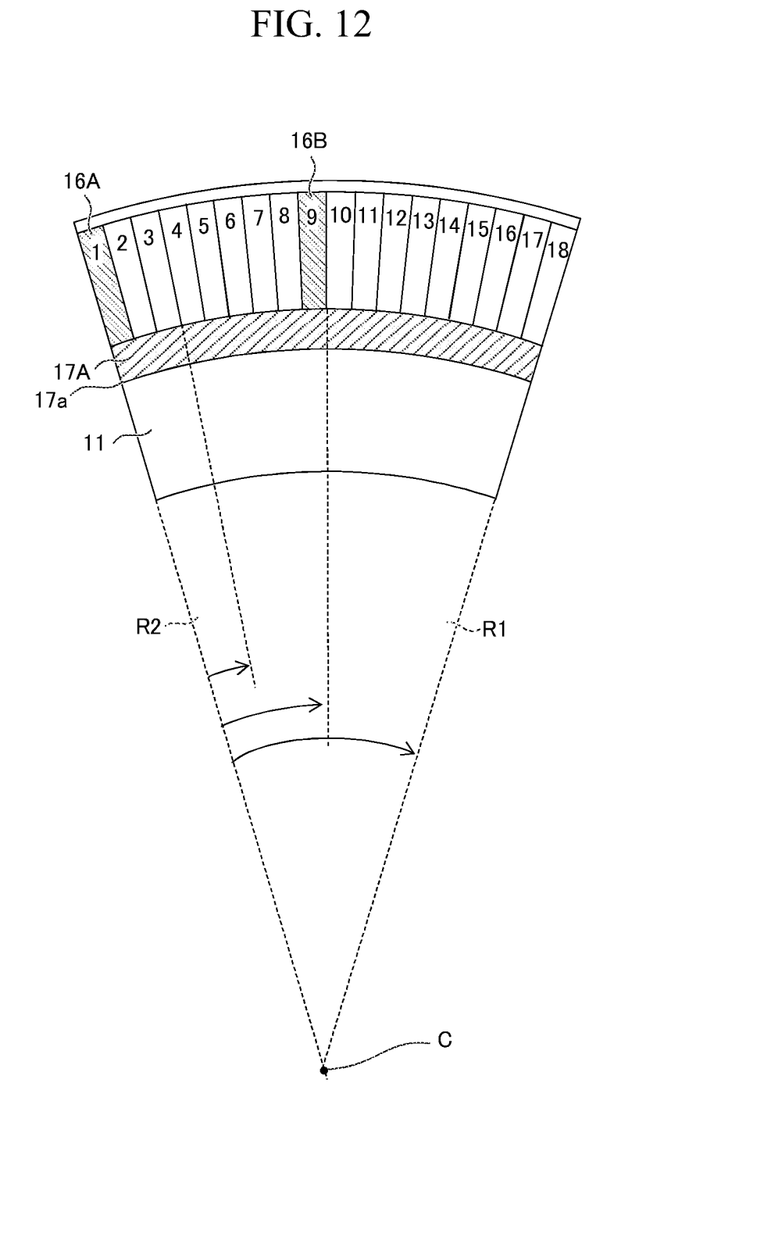
FIG. 12 is a schematic cross-sectional view of the rotor for explaining an analysis model according to Example 3.
Figure 14:
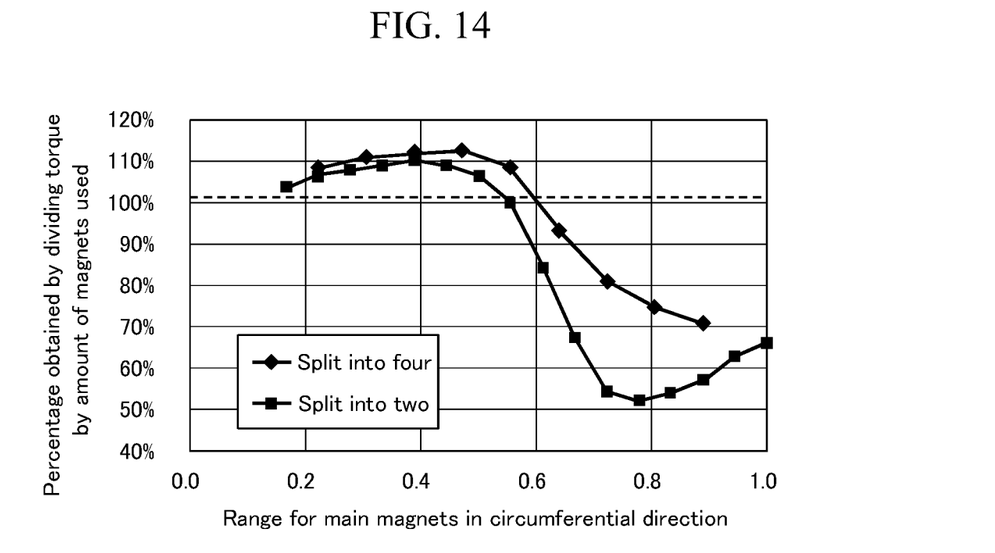
FIG. 14 is a graph showing the relation between the range (arrangement region) for the main magnets arranged in the circumferential direction and the results obtained by dividing the torque by the amount of magnets used according to Examples 3 and 4.
Figure 15:
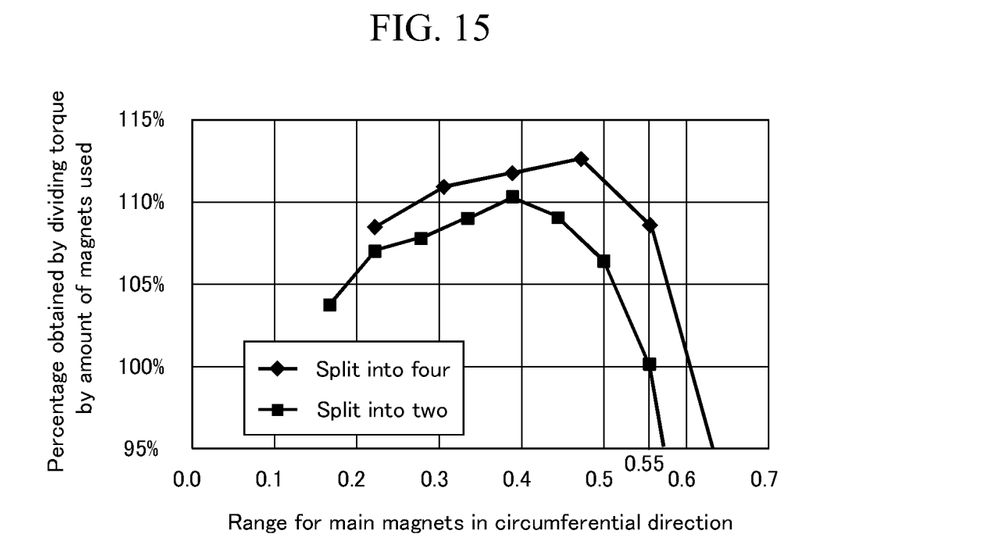
FIG. 15 is a view for explaining the main part of the graph of FIG. 14.

As illustrated in FIG. 12, in the model of Example 1, the arrangement region of the main magnets is split into 18 sections in the circumferential direction, with one main magnet 16A of the two main magnets 16A and 16B disposed at the end 17a (position "1" in FIG. 12) of the auxiliary magnet 17A and the other main magnet 16B disposed at each of the positions ("3" to "18") in FIG. 12, and the torque of the rotor at each of these positions was calculated and a value was obtained by dividing the torque by the amount of magnets used at each position. The results are shown in FIG. 14 and FIG. 15. In FIG. 14 and FIG. 15, the central angle of the entire fan-shaped region where the auxiliary magnet of each magnetic pole is disposed is defined as 1.0, and the central angle of the arrangement region R2 for the main magnets 16A and 16B is indicated. It should be noted that FIG. 12 shows an example in which the other main magnet 16B is disposed at the position "9."

Example 4

Figure 13:
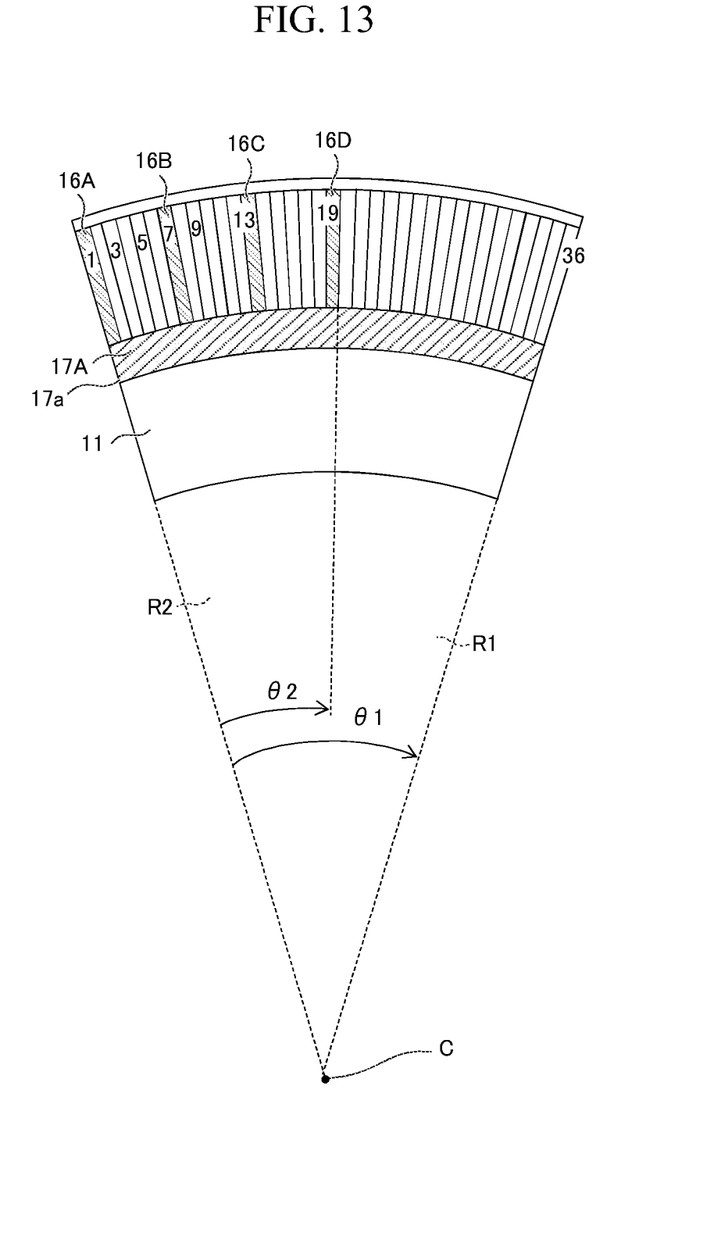
FIG. 13 is a schematic cross-sectional view of the rotor for explaining an analysis model according to Example 4.

As illustrated in FIG. 13, in the model of Example 2, the arrangement region for the main magnets was split into 36 sections in the circumferential direction, with one main magnet 16A of the four main magnets 16A to 16D disposed at the end 17a (position "1" in FIG. 13) of the auxiliary magnet 17A and three other main magnets 16B to 16D arranged such that the four main magnets 16A to 16B are equidistantly arranged, and a value was obtained by dividing the torque by the amount of magnets used at each position. The results are shown in FIG. 14 and FIG. 15.

As illustrated in FIG. 14 and FIG. 15, when the range for the main magnets in the circumferential direction is 0.55 or smaller, 100% can be secured as a percentage obtained by dividing the torque by the amount of magnets used. Thus, the advantageous effect can be expected from the asymmetrical arrangement of the main magnets relative to the virtual line, and when the range for the main magnets in the circumferential direction is 0.10 or greater, a plurality of main magnets can be arranged, so that the sufficient advantageous effect therefrom can be expected.

In view of the foregoing, when the plurality of main magnets of each magnetic pole is arranged within the arrangement region having a central angle obtained by multiplying, by a coefficient of 0.10 to 0.55, the central angle of the entire fan-shaped region where the auxiliary magnet of each magnetic pole is disposed, with the rotation axis as the center, the result obtained by dividing the torque by the amount of magnets used can be improved.

The embodiment of the present disclosure has been described in detail, but the present disclosure is not limited to the above embodiment, and various design changes may be made thereto without departing the spirit of the present disclosure described in the scope of the claims.

What is claimed is:

1. A rotating electrical machine comprising:
  a rotor with permanent magnets embedded in a rotor core made of a soft magnetic material; and
  a stator positioned on an outer circumference of the rotor, wherein:
  the permanent magnets include a plurality of main magnets arranged so as to be magnetized in a circumferential direction of the rotor, and a plurality of auxiliary magnets arranged so as to be magnetized in a radial direction of the rotor,
  the plurality of auxiliary magnets are embedded in the rotor core so as to surround a rotation axis of the rotor in a cross-section orthogonal to the rotation axis,
  the plurality of main magnets are embedded in the rotor core so as to extend from the auxiliary magnets in an outer circumferential direction of the rotor,
  a plurality of magnetic poles of the rotor is formed around the rotation axis, the magnetic poles each having one of the plurality of auxiliary magnets and a plurality of the plurality of main magnets arranged at a distance from each other in the circumferential direction of the rotor, the soft magnetic material being disposed between the main magnets,
  in the cross-section orthogonal to the rotation axis, the plurality of main magnets of each magnetic pole are arranged asymmetrically about a virtual line passing the rotation axis and axisymmetrically dividing the auxiliary magnet of each magnetic pole, and
  in the cross-section, with the rotation axis as a center, the plurality of main magnets of each magnetic pole is arranged within an arrangement region having a central angle obtained by multiplying, by a coefficient of 0.10 to 0.55, a central angle of an entire fan-shaped region where the auxiliary magnet of each magnetic pole is disposed.

2. The rotating electrical machine according to claim 1, wherein in each magnetic pole, one of the plurality of main magnets is disposed at an end of one of the plurality of auxiliary magnets.

* * * * *